United States Patent [19]

Ishii

[11] Patent Number: 5,774,978

[45] Date of Patent: Jul. 7, 1998

[54] APPARATUS FOR REMOVING ELECTRODE TIP FROM WELDING TOOL WITH VIBRATIONS

[75] Inventor: Tomomi Ishii, Nagoya, Japan

[73] Assignee: Kabushiki Kaisha Kyokuto, Aichi, Japan

[21] Appl. No.: 605,279

[22] Filed: Feb. 7, 1996

[30] Foreign Application Priority Data

Jul. 22, 1995 [JP] Japan .................. 7-008519 U

[51] Int. Cl.⁶ .................................................. B23P 19/00
[52] U.S. Cl. ............................................................ 29/821
[58] Field of Search ................... 29/426.5, 821; 81/463, 464

[56] References Cited

U.S. PATENT DOCUMENTS 3,328,870  7/1967  Rabinovich et al. ................ 29/821
3,861,250  1/1975  Zugai ........................... 29/426.5 X
5,577,312  11/1996  Seto ............................ 29/426.5 X

FOREIGN PATENT DOCUMENTS 6-63872  3/1994  Japan .............................. 29/821

Primary Examiner—S. Thomas Hughes
Attorney, Agent, or Firm—Koda and Androlia

[57] ABSTRACT

An apparatus used in removing an electrode tip from the tip end of a welding tool, such as a welding gun, including a main body having a vibration block which is repeatedly hit by a hammer at a rate of, for example, 3,600 times a minute. The vibration block is provided with a tip end holding hole which receives the tip end of the welding tool. When the welding tool with the tip end in the tip end holding hole is vibrated by the hammer which is vibrated by pressured air, the electrode chip is vibrated and removed from the welding tool by the vibration. The removed tip can stay in the tip end holding hole after being removed, thus being prevented from flying out of the vibration block.

6 Claims, 2 Drawing Sheets

APPARATUS FOR REMOVING ELECTRODE TIP FROM WELDING TOOL WITH VIBRATIONS

BACKGROUND OF THE INVENTION

1. Field of the Invention

The present invention relates to an apparatus for removing an electrode tip from a tool which is used for resistor welding.

2. Prior Art

A robot gun used for resistor welding (called "welding gun") has an electrode tip at the end thereof, and the electrode tip is installed via a tapered engagement. In other words, the end of the welding gun is made into a truncated cone shaped protrusion for engagement so that the electrode tip is disposed therein. The thus installed electrode tip is worn out as the number of weld butting increases; therefore, the tip is ground and reshaped for further use. However, after repeated grinding and reshaping, the electrode tip will eventually have to be removed from the tip of the welding gun so as to be replaced with a new one.

Conventionally, when a used electrode tip is removed from the tip of the welding gun, a particular removing apparatus has been used. This removing apparatus has a main body with a vibration hammer mounted adjacent to a central portion of the main body so that the vibration hammer can reciprocate in a horizontal direction. The vibration hammer that makes a horizontal reciprocation by air pressure generated by compressed air is brought into contact with a side surface of an electrode tip that is in tapered engagement with a tip of a welding gun. The vibration hammer generates minute vibrations at a frequency of about 3,600 times per minute and minutely vibrates the electrode tip so that the electrode tip can automatically be released from the tip of the welding gun.

In accordance with this conventional apparatus, the vibration hammer is designed so that its tip end does not hit the tip of the welding gun once the electrode tip has been removed so as to avoid damage to the tip of the welding gun. In order to accomplish this, a pair of stays are provided on both the right and left sides of the apparatus main body, and sensors are mounted on the stays. When the sensors detect the moment when the electrode tip has just been removed from the tip of the welding gun by vibration, the supply of compressed air is stopped so as to cease the hitting motion of the vibration hammer.

However, at the moment when the electrode tip has just been removed by vibration from the tip of the welding gun, some of the cooling water, that is circulated in the tip of the welding gun so as to cool the electrode tip, leaks out. As a result, the detection by the sensors is delayed, or the supply of compressed air may not be stopped at a specified timing due to a mechanical time lag. If this delay occurs, the vibration hammer hits the tip of the welding gun even after the electrode tip has been removed, thus causing dents in the tip of the welding gun. The dents obviously lowers the engagement force between the new electrode tip and the tip of the welding gun. Furthermore, the electrode tip and the vibration hammer need to be positioned with respect to each other based on the intuition and eye measurement of a user every time the electrode tip is remove. As a result, the user must be highly skilled, otherwise the work efficiency becomes significantly low. Moreover, as the electrode tip is removed from the tip of the welding gun, the electrode tip may fly off in any direction as a result of the pressing force and the vibration force caused by the vibration hammer. This is very dangerous.

SUMMARY OF THE INVENTION

Accordingly, the main object of the present invention is to solve the problems of the prior art apparatus described above.

It is another object of the present invention to provide an apparatus for removing an electrode tip from a resistor welding tool such as a welding gun which prevents the vibration hammer from hitting and causing dents in the tip of the welding tool after the electrode tip has been removed.

It is also an object of the present invention to provide an apparatus for removing an electrode tip for a resistor welding tool which facilitates the relative positioning of the electrode tip and the vibration hammer so that the electrode tip, that has been removed from the tip of the welding gun, is prevented from flying away, thereby providing a safe working condition.

The objects of the present invention are accomplished by a unique structure for an electrode tip removing apparatus in which a vibration hammer is disposed adjacent to a central portion of the main body of the apparatus so as to make a horizontal reciprocation motion by air pressure generated by compressed air for generating minute vibrations and to contact a side surface of an electrode tip that is disposed, in a tapered engagement, at the tip of a welding gun, thus minutely vibrating and then releasing the electrode tip from the tapered engagement at the tip of the welding gun, and the unique structure of the present invention is that a vibration block that has a hole for receiving the electrode tip therein is provided between a pair of arm blocks which extend from both sides of the apparatus main body in a manner that the vibration block is slidable in the same axial direction as the vibration hammer by a specified amplitude. In this structure, the vibration block has an engagement surface formed in the shape of an arc which is kept pushed toward the vibration hammer.

With the apparatus described above, the electrode tip, that is in tapered engagement with the tip of the welding gun, is inserted in the electrode tip insertion hole formed in the vibration block. Thereafter, the vibration hammer is actuated by the air pressure so that the tip of the vibration hammer is brought into contact with the side surface of the vibration block and minute vibrations are generated thereby. As a result, the minute vibrations of the vibration hammer are transmitted to the vibration block and minutely vibrate the vibration block so that the vibration block in turn minutely vibrates the electrode tip, thus causing the electrode tip to vibrate so as to be removed from the tip of the welding gun.

When the electrode tip is removed by vibration from the tip of the welding gun, the tip of the welding gun remains inside the electrode tip insertion hole of the vibration block. Thus, the tip of the welding gun is protected by the vibration block, and the vibration hammer does not hit the welding gun, preventing any dents from being formed in the tip of the welding gun.

DESCRIPTION OF THE PREFERRED EMBODIMENTS

Embodiments of the present invention will be described below with reference to the accompanying drawings.

Figure 1:
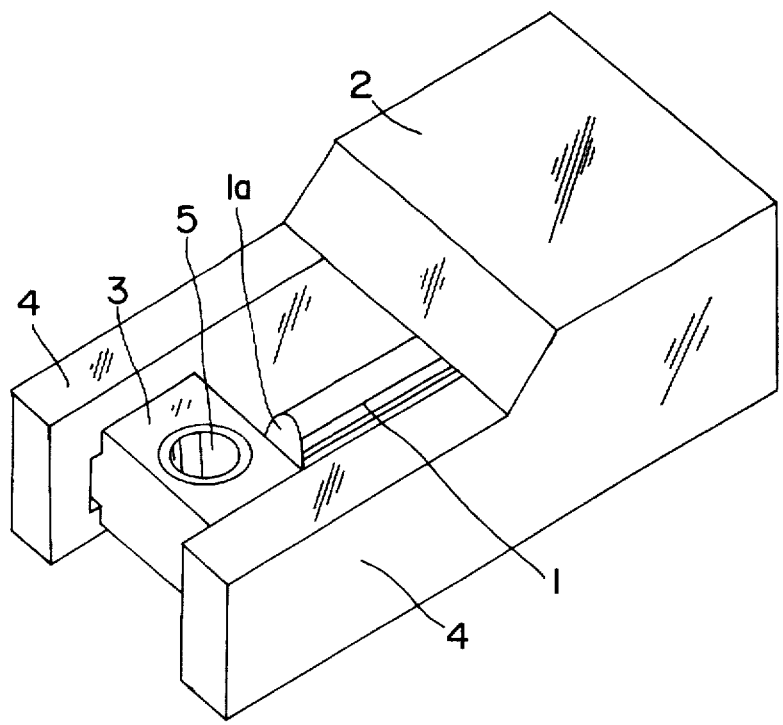
FIG. 1 is a perspective view of a main portion of the electrode tip removing apparatus according to the present invention.
Figure 2:
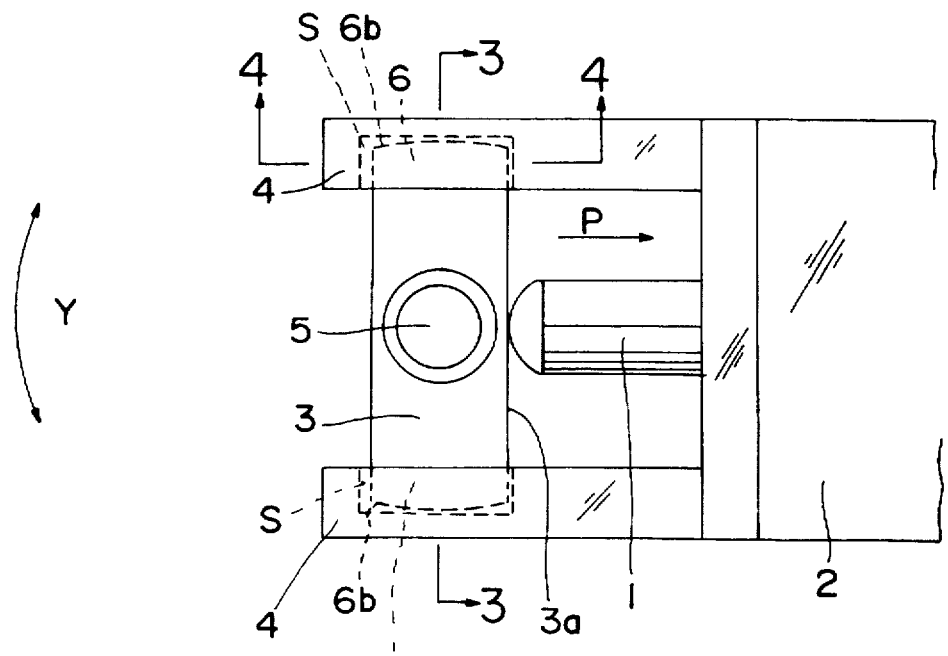
FIG. 2 is a top view of the main portion.
Figure 3:
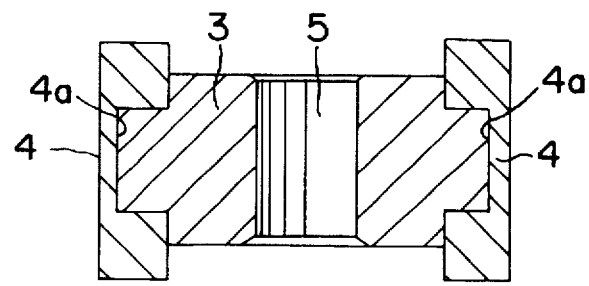
FIG. 3 is a cross sectional view taken along the line 3—3 in FIG. 2.

The reference numeral 1 refers to a vibration hammer which is disposed at substantially a central area of a main body 2 of the removing apparatus so as to make a reciprocating motion in a horizontal direction. The vibration hammer 1 has a well known structure. In other words, it is, as shown in FIGS. 1 and 2, a horizontally extending rod and is advanced by air pressure of compressed air supplied by an air source (not shown) and generates minute vibrations at a frequency of about 3,600 times per minute.

The reference numeral 3 denotes a vibration block which is provided between a pair of arm blocks 4 that extend from the main body 2 so that the vibration block 3 is movable in the axial direction of the vibration hammer 1 within a predetermined amplitude. In other words, the vibration block 3 is vibrated in the horizontal direction by the vibration hammer 1. The vibration block 3 has an electrode tip insertion hole 5 at its center that receives an electrode tip B (see FIG. 5) which is in a tapered engagement with a tip portion of a welding gun A. The insertion hole 5 extends vertically in the vibration block 3 so that the electrode tip B of the welding gun A can be inserted either from the top side or the down side of the electrode tip insertion hole 5. In other words, the insertion hole 5 is a through-hole extending from one side (top side) to the other (bottom side). The electrode tip insertion hole 5 has an internal diameter which is to fit to an external diameter of the electrode tip B. The vibration block 3 is urged toward the vibration hammer 1 as shown by arrow P by springs 5' which are respectively provided in each of the arm blocks 4 as seen from FIG. 4. Compressed air can be used for urging the vibration block 3 instead of the springs 5'.

In use, the electrode tip B, that is in tapered engagement with the tip portion of the welding gun A, is inserted into the electrode tip insertion hole 5. The electrode tip insertion hole 5 is provided at a location most appropriate for removal of the electrode tip B. In other words, the insertion hole 5 is formed on an imaginary line extending from the axis of the vibration hammer 1. As a result, the electrode tip B is easily positioned correctly with respect to the hammer 1 by simply inserting the electrode tip B into the tip insertion hole 5.

When, thereafter, compressed air is supplied, the vibration hammer 1 vibrates. During this vibration, when the hammer 1 is advanced by the compressed air toward the vibration block 3, the tip of the vibration hammer 1 hits the inner side surface 3a of the vibration block 3. As a result, the vibration block 3 is vibrated at a frequency of, for example, about 3,600 times per minute.

The vibration block 3 is, as described above, urged toward the vibration hammer 1 by the spring 5'; therefore, the vibration block 3 is tightly engaged with the vibration hammer 1. Accordingly, the minute vibrations of the vibration hammer 1 are efficiently transmitted to the vibration block 3 so as to minutely vibrate the vibration block 3.

As a result, the vibration block 3 minutely vibrates the electrode tip B that is in tapered engagement with the tip portion of the welding gun A and is inserted in the electrode tip insertion hole 5 of the vibration block 3. The electrode tip B can thus be released by vibration from the tip portion of the welding gun A.

In the structure above, the vibration block 3 has engagement projections 6 at both ends thereof. The engagement projections 6 are engaged with rectangular engagement recesses 4a formed in the arm block 4 so as to face each other with spaces S left inside of each of the recesses 4a, thus leaving room in each of the recesses 4a that can allow the vibration block 3 to move or vibrate.

Figure 4:
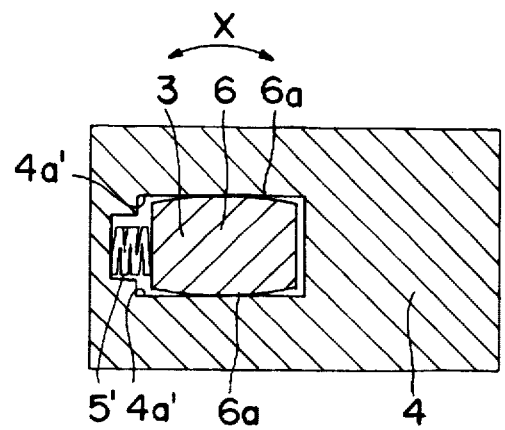
FIG. 4 is a cross sectional view taken along the line 4—4 in FIG. 2.
Figure 5:
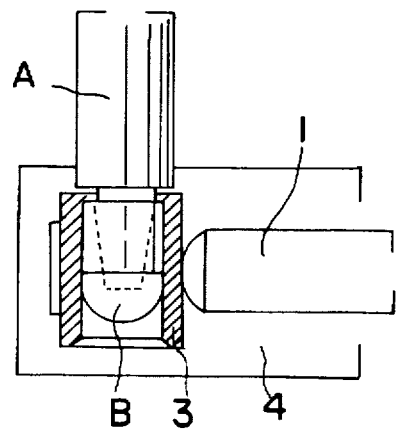
FIG. 5 is a cross sectional view of the tip removing apparatus in use.

Preferably, the top and bottom surfaces 6a of the engagement projections 6 are formed into a convex arc shape as best seen in FIG. 4, and the top and bottom inner surfaces of the engagement recesses 4a' are flat. With these shapes, the front-to-rear tilt movement X is additionally made to the horizontal vibrational movement of the vibration block 3, thus having the vibration block 3 make complex minute vibrations in many directions. In addition, preferably the end surfaces 6b of the engagement projections 6 are formed into convex-curved surfaces as shown by the dotted line in FIG. 2. With this curved surface 6b end portions of the engagement projections 6, the vibration block 3 can move or vibrate in the direction shown by arrow Y in FIG. 2.

As a result, the internal surface of the electrode tip insertion hole 5 of the vibration block 3 can come in contact in a wider area with the external surface of the electrode tip B that is inserted in the electrode tip insertion hole 5 and minute vibrations are thus effectively applied to the electrode tip B.

It is preferable to form the front end surface 1a of the vibration hammer I in a convex shape. With this shape, the vibration hammer I transfers its vibration to the vibration block 3 through a spot contact point.

As can be seen from the above, the tip portion of the welding gun A can be kept in the electrode tip insertion hole 5 of the vibration block 3 even after the .electrode tip B has been removed from the welding gun A by vibration. Thus, the vibration block 3 protects the tip portion of the welding gun A. In other words, the vibration block 3 is positioned between the tip portion of the welding gun A and the vibration hammer 1; therefore, the tip portion of the vibration hammer 1 does not hit the tip portion of the welding gun A, thus preventing damage thereto.

Also, the electrode tip B that has been removed from the tip portion of the welding gun A is held by the internal surface of the electrode tip insertion hole 5 and therefore prevented from flying out of the tip insertion hole 5. Thus, there is no danger that a flying electrode tip would hurt the operator.

As described above in detail, the tip portion of the welding gun is protected by the vibration block after the electrode tip has been removed from the welding gun by vibration, and the vibration hammer is perfectly prevented from hitting the tip portion of the welding gun. Furthermore, the electrode tip is readily positioned at a predetermined location by simply inserting the electrode tip into the electrode tip insertion hole. Accordingly, the troublesome positioning work required in the prior art for setting the electrode tip with respect to the vibration hammer is not required; thus, the work efficiency is improved. Also, since the electrode tip is removed by vibration inside the electrode tip insertion hole, the electrode tip is prevented from flying out after it has been removed; thus, safety in the work is enhanced.

I claim:

1. An apparatus for removing an electrode tip from a resistor welding tool, said apparatus comprising a main body, a vibration hammer provided adjacent to a central portion of said main body in a manner reciprocal in a horizontal direction so as to be brought into contact with a side surface of said electrode tip that is in tapered engagement with a tip of said welding tool by air pressure generated by compressed air for generating minute vibrations to minutely vibrate and release said electrode tip from said tapered engagement with the tip of said welding gun, said apparatus being characterized in that said apparatus further comprises: a pair of arm blocks protruding from both sides of said main body of said apparatus, and a vibration block having a receiving hole for receiving said electrode tip, the vibration block being provided between said arm blocks in a manner slidable in a same horizontal direction as said vibration hammer by a specified amplitude, said vibration block being urged toward said vibration hammer.

2. An apparatus for removing an electrode tip from a resistor welding tool, said apparatus comprising a main body, a vibration hammer provided adjacent to a central portion of said main body in a manner reciprocal in a horizontal direction so as to be brought into contact with a side surface of said electrode tip that is in tapered engagement with a tip of said welding tool by air pressure generated by compressed air for generating minute vibrations to minutely vibrate and release said electrode tip from said tapered engagement with the tip of said welding gun, said apparatus being characterized in that said apparatus further comprises: a pair of arm blocks protruding from both sides of said main body of said apparatus, and a vibration block having a receiving hole for receiving said electrode tip, the vibration block being provided between-said arm blocks in a manner slidable in a same horizontal direction as said vibration hammer by a specified amplitude, said vibration block being urged toward said vibration hammer, and engagement surfaces of said vibration block that engage with said arm blocks are formed in a shape of an arc.

3. An apparatus for removing an electrode tip attached to an end of a welding tool comprising:

a main body having a pair of arm blocks protruding from both sides of said main body, said arm blocks being provided with engagement recesses on inner sides so as to face each other;

a vibration block movably supported by said arm blocks of said main body, said vibration block having a vertical hole therein for receiving said electrode tip of said welding tool and further having at both ends thereof engagement projections which are fitted in said engagement recesses of said arm blocks; and a vibration hammer provided in said main body, said vibration hammer being a horizontally extending rod that makes a reciprocating motion in its axial direction and comes into contact with said vibration block so as to vibrate said vibration block.

4. An apparatus according to claim 3, further comprising an urging means disposed in said engagement recesses of said arm blocks so as to keep urging said vibration block towards said vibration hammer.

5. An apparatus according to claim 3, wherein each of said engagement projections has convex outer surfaces and each of said engagement recesses has flat inner surfaces.

6. An apparatus according to claim 5, an end surface of said vibration hammer which comes into contact with said vibration block is formed into a convex shape.

* * * * *